(12) United States Patent
Hakura et al.

(10) Patent No.: US 10,223,122 B2
(45) Date of Patent: *Mar. 5, 2019

(54) MANAGING EVENT COUNT REPORTS IN A TILE-BASED ARCHITECTURE

(71) Applicant: NVIDIA Corporation, Santa Clara, CA (US)

(72) Inventors: Ziyad S. Hakura, Gilroy, CA (US); Jerome F. Duluk, Jr., Palo Alto, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/482,779

(22) Filed: Apr. 9, 2017

(65) Prior Publication Data

US 2017/0213313 A1    Jul. 27, 2017

Related U.S. Application Data

(63) Continuation of application No. 14/046,249, filed on Oct. 4, 2013, now Pat. No. 9,639,367.

(Continued)

(51) Int. Cl.
*G06F 9/38* (2018.01)
*G06T 15/00* (2011.01)
(Continued)

(52) U.S. Cl.
CPC .............. *G06F 9/38* (2013.01); *G06F 9/44* (2013.01); *G06F 12/0808* (2013.01); *G06F 12/0875* (2013.01); *G06T 1/20* (2013.01); *G06T 1/60* (2013.01); *G06T 15/005* (2013.01); *G06T 15/405* (2013.01); *G06T 15/503* (2013.01); *G06T 15/80* (2013.01); *G06T 17/20* (2013.01); *G09G 5/003* (2013.01); *G09G 5/395* (2013.01);
(Continued)

(58) Field of Classification Search
None
See application file for complete search history.

(56) References Cited

U.S. PATENT DOCUMENTS 6,323,860 B1    11/2001    Zhu et al.
6,535,209 B1    3/2003    Abdalla et al.
(Continued)

OTHER PUBLICATIONS

Non-Final Office Action for U.S. Appl. No. 14/045,361 dated Feb. 26, 2016.

*Primary Examiner* — Vu Nguyen
(74) *Attorney, Agent, or Firm* — Artegis Law Group, LLP

(57) ABSTRACT

One embodiment of the present invention sets forth a graphics processing system configured to track event counts in a tile-based architecture. The graphics processing system includes a screen-space pipeline and a tiling unit. The screen-space pipeline includes a first unit, a count memory associated with the first unit, and an accumulating memory associated with the first unit. The first unit is configured to detect an event type and increment the count memory. The tiling unit is configured to cause the screen-space pipeline to update an external memory address to reflect a first value stored in the count memory when the first unit completes processing of a first set of primitives. The tiling unit is also configured to cause the screen-space pipeline to update the accumulating memory to reflect a second value stored in the count memory when the first unit completes processing of a second set of primitives.

23 Claims, 11 Drawing Sheets

Related U.S. Application Data

(60) Provisional application No. 61/719,271, filed on Oct. 26, 2012.

(51) Int. Cl.
*G06T 15/40* (2011.01)
*G06T 1/20* (2006.01)
*G06T 1/60* (2006.01)
*G09G 5/395* (2006.01)
*G09G 5/00* (2006.01)
*G06T 15/50* (2011.01)
*G06F 12/0808* (2016.01)
*G06F 12/0875* (2016.01)
*G06F 9/44* (2018.01)
*G06T 15/80* (2011.01)
*G06T 17/20* (2006.01)

(52) U.S. Cl.
CPC ........ *G06F 2212/302* (2013.01); *Y02D 10/13* (2018.01)

(56) References Cited

U.S. PATENT DOCUMENTS

| | | |
|---|---|---|
| 6,697,063 B1 | 2/2004 | Zhu |
| 7,102,646 B1 | 9/2006 | Rubinstein et al. |
| 7,170,515 B1 | 1/2007 | Zhu et al. |
| 8,605,102 B1 | 12/2013 | Purcell et al. |
| 2009/0058848 A1 | 3/2009 | Howson |
| 2010/0169608 A1 | 7/2010 | Kuo |

MANAGING EVENT COUNT REPORTS IN A TILE-BASED ARCHITECTURE

CROSS-REFERENCE TO RELATED APPLICATIONS

This application is a continuation of U.S. non-provisional patent application Ser. No. 14/046,249, filed Oct. 4, 2013 and titled "MANAGING EVENT COUNT REPORTS IN A TILE-BASED ARCHITECTURE", which claims benefit of U.S. provisional patent application Ser. No. 61/719,271, filed Oct. 26, 2012 and titled "AN APPROACH FOR TILED CACHING." The subject matter of these related applications is hereby incorporated herein by reference.

BACKGROUND OF THE INVENTION

Field of the Invention

Embodiments of the present invention relate generally to graphics processing and, more specifically, to managing event count reports in a tile-based architecture.

Description of the Related Art

In typical operation, a graphics processing pipeline may be directed to provide a count of a number of occurrences of a certain event. For example, the graphics processing pipeline may be directed to record the number of pixels that pass a z-test or the number of pixels for which a specified operation is performed in the pixel shader. Such counts may be useful to an application, which may condition certain work on such counts. For example, certain rendering operations may be conditioned on the count associated with a "z-pass pixel test," where those rendering operations are performed only when the number of pixels that pass a z-test exceeds a certain threshold value.

Some graphics subsystems for rendering graphics images implement a tiling architecture, where one or more render targets, such as a frame buffer, are divided into screen space partitions referred to as "tiles." In such a tiling architecture, the graphics subsystem rearranges work such that the work associated with any particular tile remains in an on-chip cache for a longer time than with an architecture that does not rearrange work in this manner. This rearrangement helps to improve memory bandwidth as compared with a non-tiling architecture.

In graphics subsystems that implement a tiling architecture and re-order work, the event counts discussed above may not provide the desired results. More specifically, because the work is re-ordered, the mechanisms that record the requested counts may record incorrect numbers. For example, a first set of work and a second set of work could be divided into several subsets, each associated with a different tile, which would then be interleaved. If a count request were to request an event count associated with the first set of work, then when the first set of work and second set of work were interleaved, the count request would include values associated with both the first set of work and the second set of work, which is not what is requested.

As the foregoing illustrates, what is needed in the art is a more effective technique for counting event occurrences in a tile-based architecture.

SUMMARY OF THE PRESENT INVENTION

One embodiment of the present invention sets forth a graphics processing system configured to track event counts in a tile-based architecture. The graphics processing system includes a screen-space pipeline and a tiling unit. The screen-space pipeline includes a first unit, a count memory associated with the first unit, and an accumulating memory associated with the first unit. The first unit is configured to detect an event type and increment the count memory in response. The tiling unit is configured to cause the screen-space pipeline to update an external memory address to reflect a first value stored in the count memory when the first unit completes processing of a first set of primitives that overlap a first cache tile. The tiling unit is also configured to cause the screen-space pipeline to update the accumulating memory to reflect a second value stored in the count memory when the first unit completes processing of a second set of primitives that overlap the first cache tile. At least one primitive in the first set of primitives and at least one primitive in the second set of primitives are configured to cause the first unit to detect the event type and increment the count memory.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
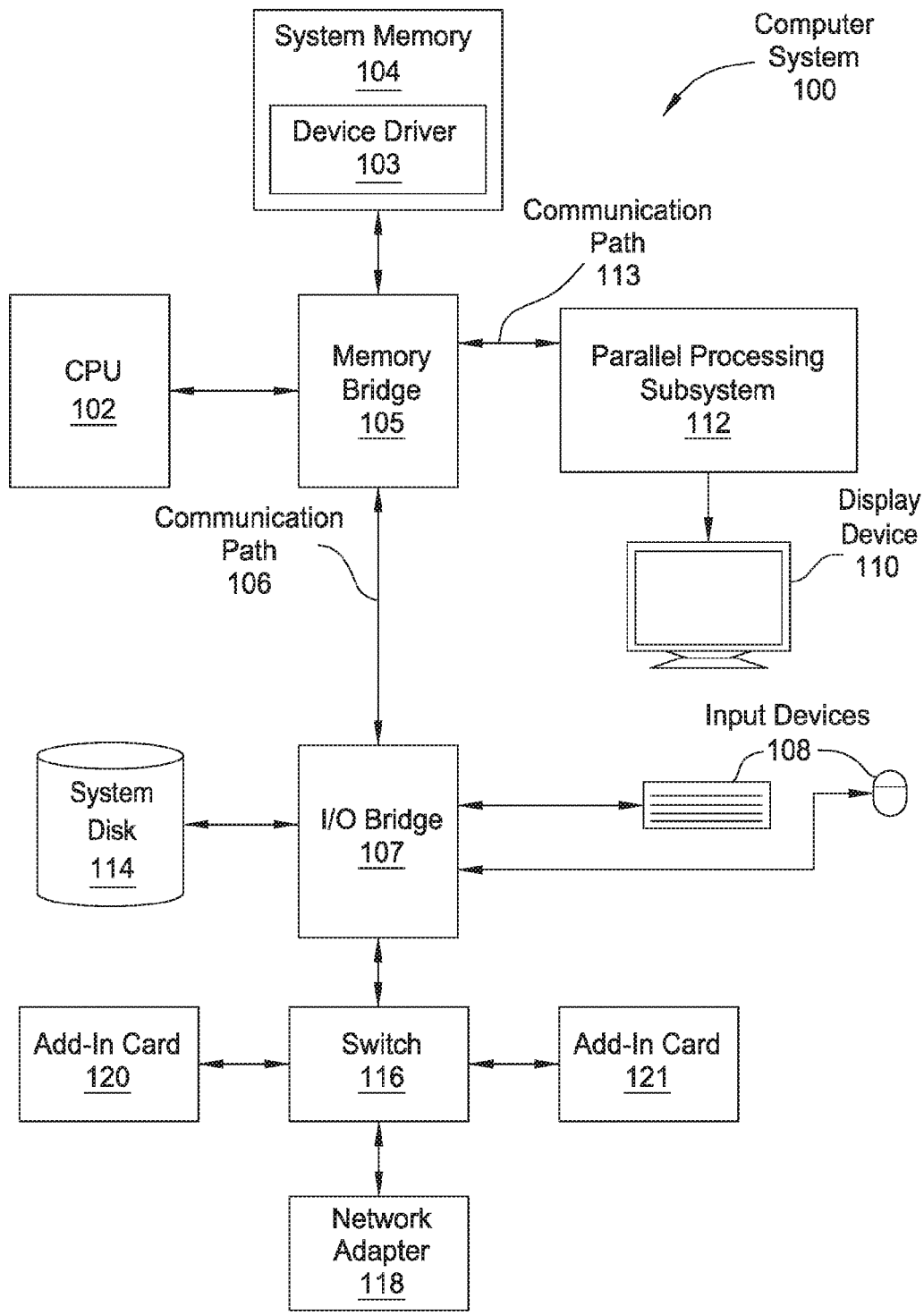
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
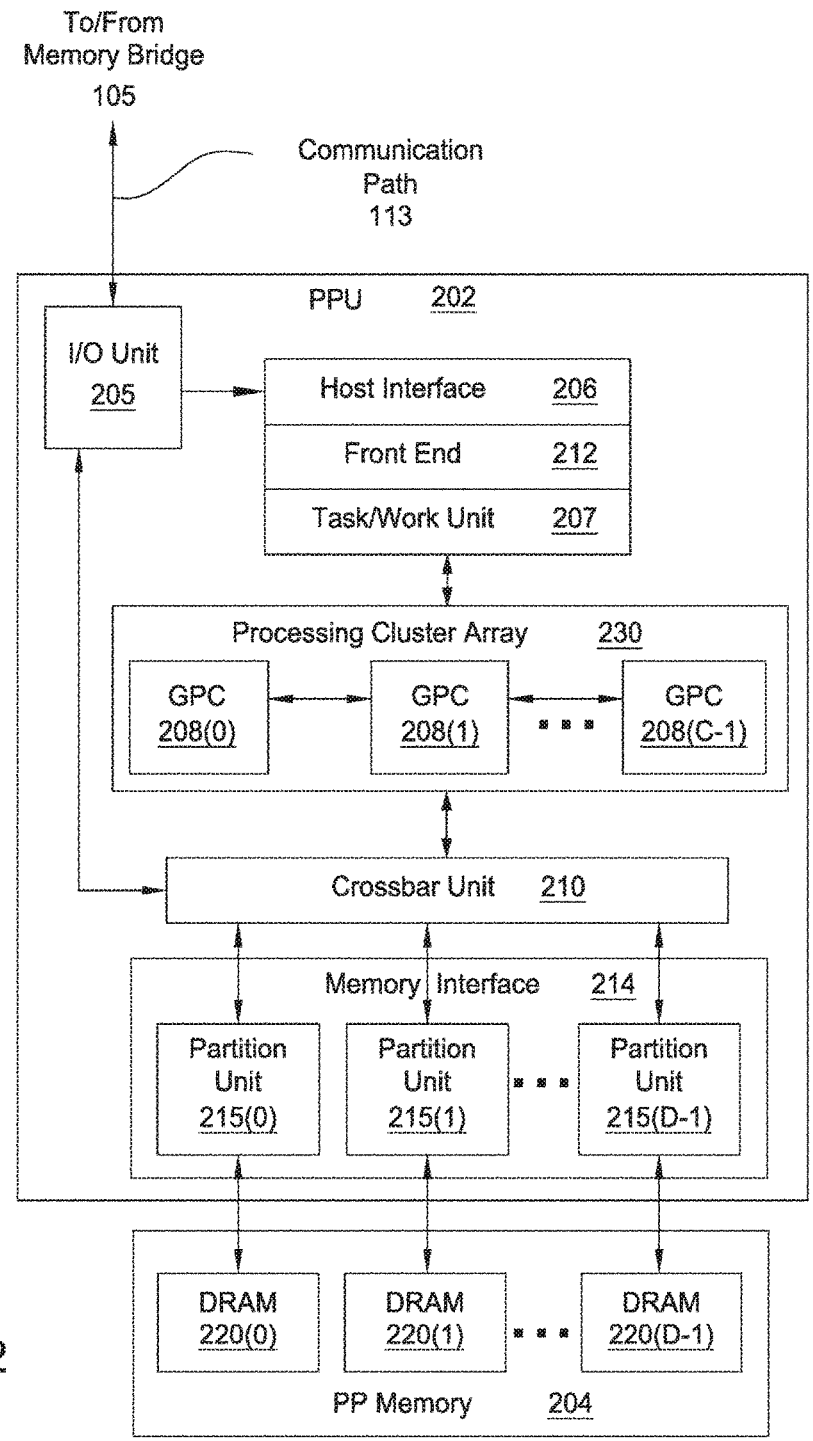
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
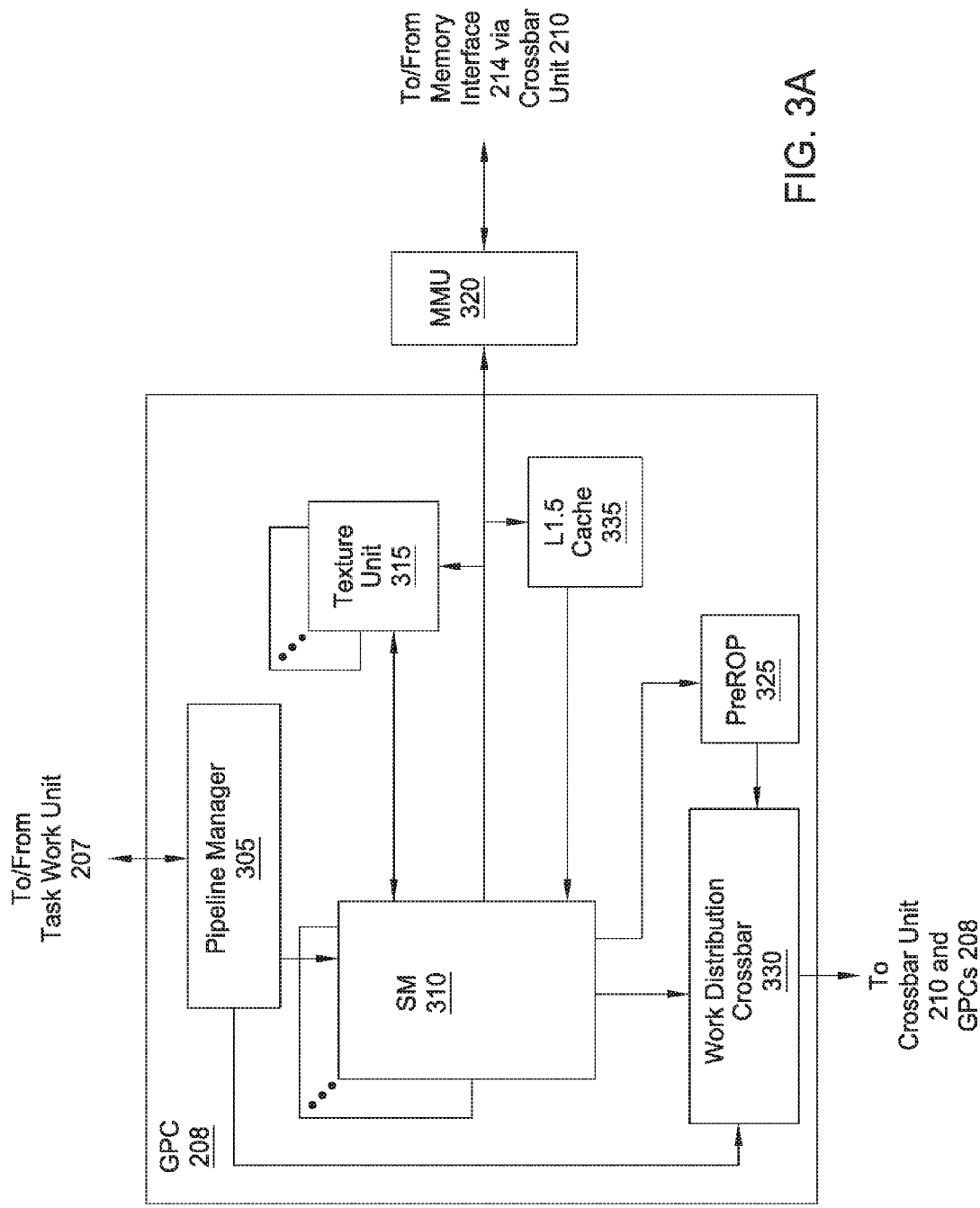
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
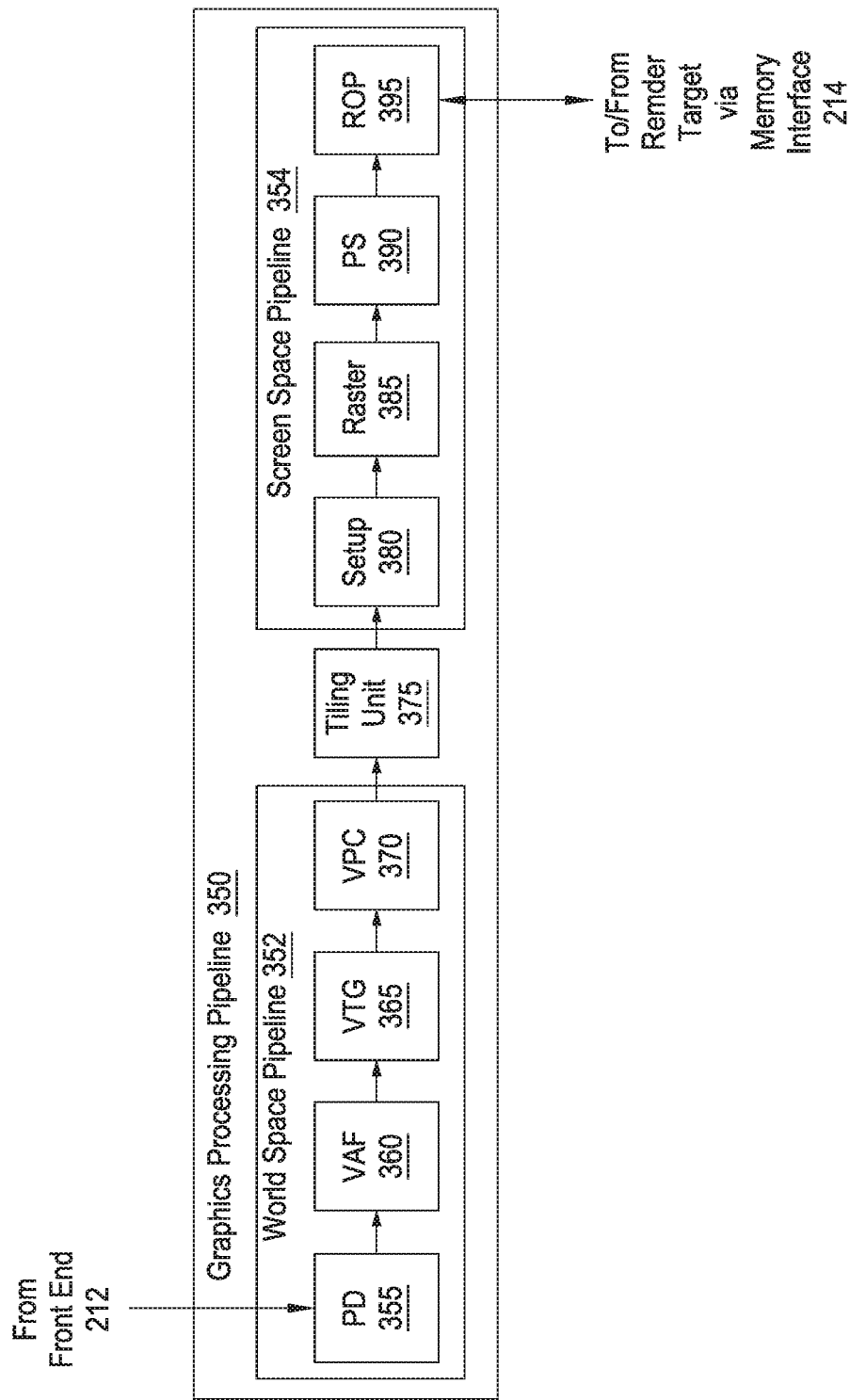
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360, and produce graphics primitives, as well as color values, surface normal vectors, and transparency values at each vertex for the graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Tiled Caching

Figure 4:
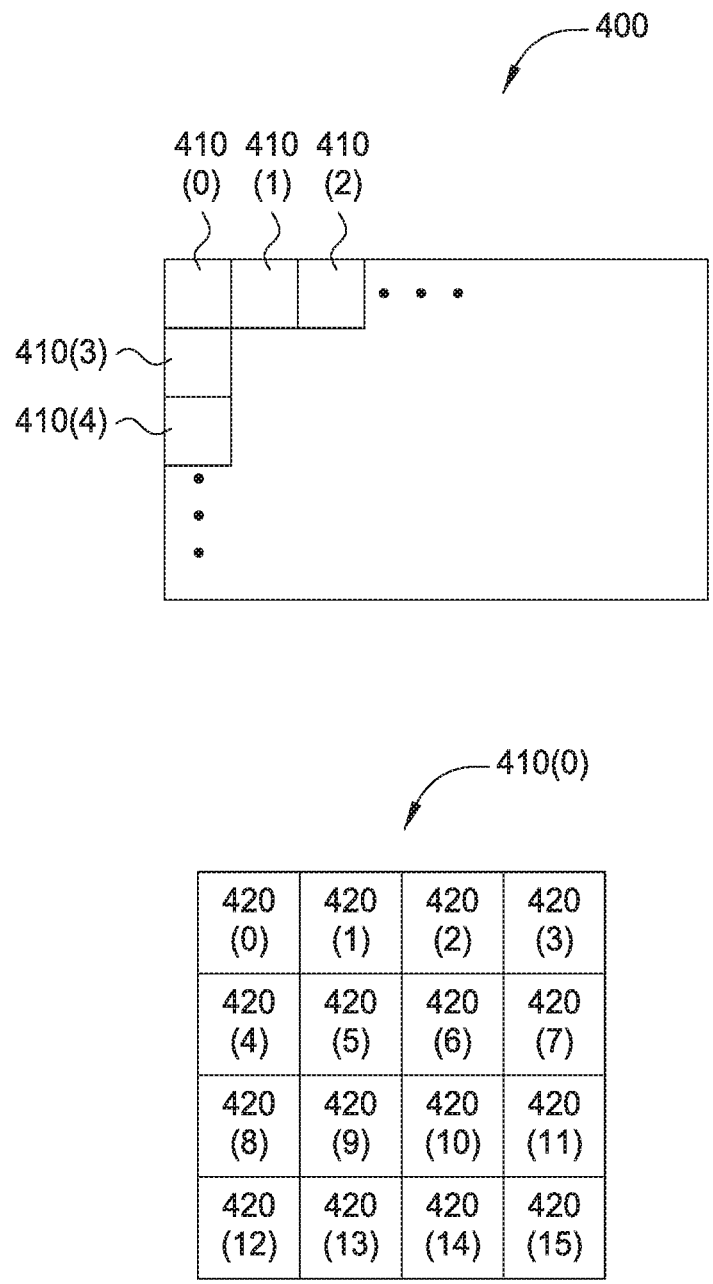
FIG. 4 is a conceptual diagram of a cache tile that the graphics processing pipeline of FIG. 3B may be configured to generate and process, according to one embodiment of the present invention.

FIG. 4 is a conceptual diagram of a cache tile 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

Tiling Unit Operation

Figure 5:
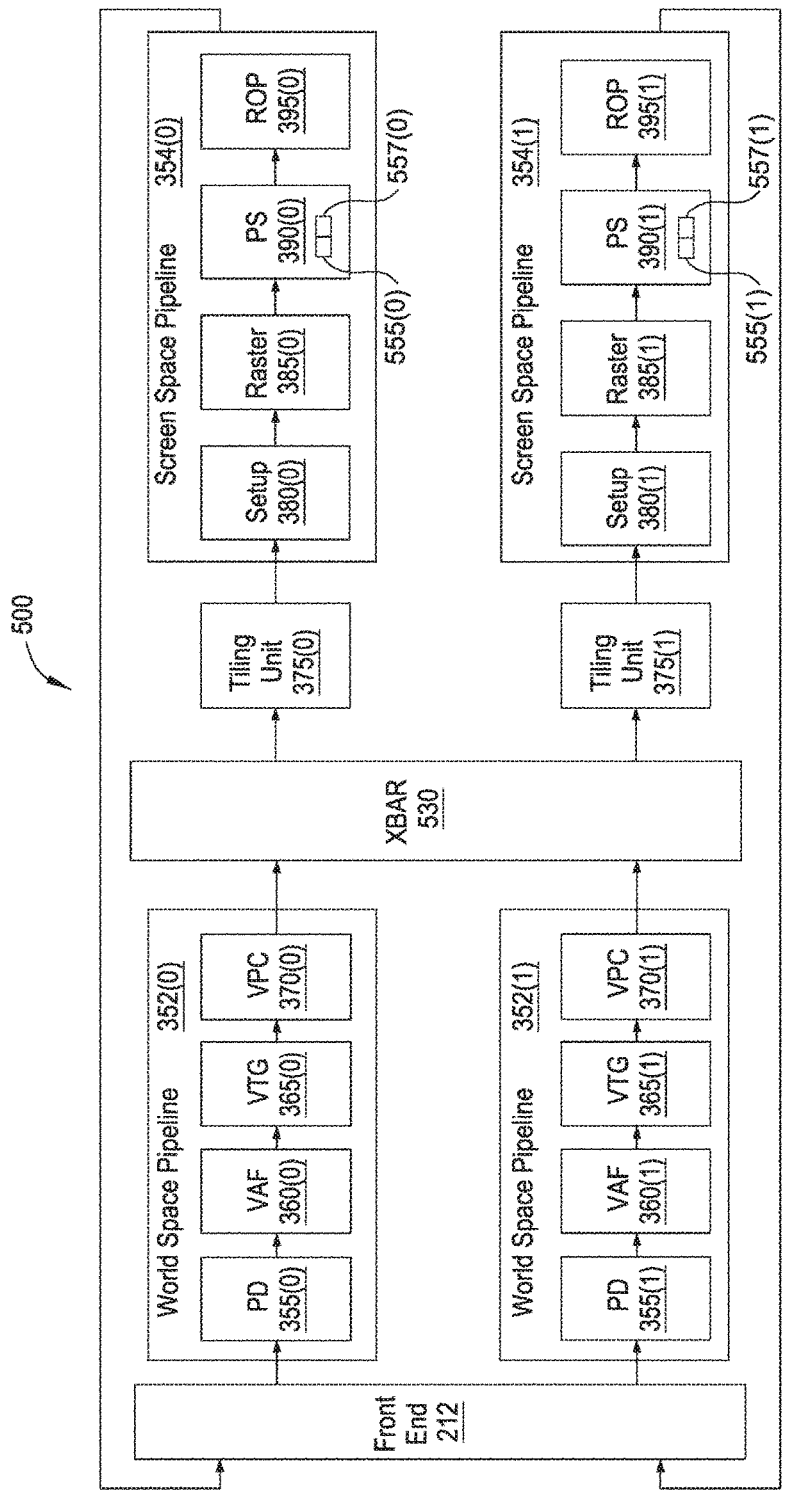
FIG. 5 is a block diagram of a graphics subsystem configured to implement cache tiling, according to one embodiment of the present invention.

FIG. 5 illustrates a graphics subsystem configured to implement cache tiling, according to one embodiment of the present invention. The graphics subsystem 500 illustrates several units that are described above with respect to FIG. 3B. As shown, the graphics subsystem 500 includes a front end unit 212, a first world-space pipeline 352(0), a second world-space pipeline 352(1), a crossbar unit 530 ("XBAR"), a first tiling unit 575(0), a second tiling unit 575(1), a first screen-space pipeline 354(0), and a second screen-space pipeline 354(1).

The graphics subsystem 500 includes at least two instances of the screen-space pipeline 354 and the world-space pipeline 352, for increased performance. The graphics subsystem 500 also includes a crossbar unit 530 for transmitting work output from the first world-space pipeline 352(0) and the second world-space pipeline 352(1) to the first tiling unit 575(0) and the second tiling unit 575(1). Although depicted in FIG. 5 with two instances of the world-space pipeline 352 and the screen-space pipeline 354, the teachings provided herein apply to graphics pipelines having any number of world-space pipelines 352 and screen-space pipelines 354. Each of the screen-space pipeline 354 and the world-space pipeline 352 are described in more detail above with respect to FIG. 3B.

The functionality of the world-space pipelines 352 and the screen-space pipelines 354 are implemented by processing entities such as general processing clusters (GPC) 208, described above. In one embodiment, the first world-space pipeline 352(0) may be implemented in a first GPC 208(0) and the second world-space pipeline 352(1) may be implemented in a second GPC 208(1). As a general matter, each screen-space pipeline 352 may be implemented in a different GPC 208, and in a similar fashion, each world-space pipeline 354 may be implemented in a different GPC 208. Further, a given GPC 208 can implement a world-space pipeline 354 and also a screen-space pipeline 352. For example, the first GPC 208(0) may implement both the first world-space pipeline 352(0) and the first screen-space pipeline 354(0). In embodiments that include more than one screen-space pipeline 354, each screen-space pipeline 354 is associated with a different set of raster tiles 420 for any particular render target. Again, each of the screen-space pipeline 354 and world-space pipeline 352 are described in more detail above with respect to FIG. 3B.

Each of the pipeline units in the world-space pipelines 352 (i.e., primitive distributor 355, vertex attribute fetch unit 360, vertex, tessellation, geometry processing unit 365, and viewport scale, cull, and clip unit 370) and in the screen-space pipelines 354 (i.e., setup 380, rasterizer 385, pixel shader 390, and ROP 395) depicted in FIG. 5 functions in a similar manner as described above with respect to FIGS. 1-4.

A device driver 103 transmits instructions to the front end unit 212. The instructions include primitives and commands to bind render targets, arranged in application-programming-interface order (API order). API order is the order in which the device driver 103 specifies that the commands should be executed and is typically specified by an application executing on CPU 102. For example, an application may specify that a first primitive is to be drawn and then that a second primitive is to be drawn. The application may also specify that certain work is to be rendered to a particular render target, or that one or more render targets are to be bound.

When the front end unit 212 receives the instructions from the device driver 103, the front end unit 212 distributes tasks associated with the instructions to the world-space pipelines 352 for processing. In one embodiment, the front end unit 212 assigns tasks to the first world-space pipeline 352(0) and the second world-space pipeline 352(1) in round-robin order. For example, the front end unit 212 may transmit tasks for a first batch of primitives associated with the instructions to the first world-space pipeline 352(0) and tasks for a second batch of primitives associated with the instructions to the second world-space pipeline 352(1).

Each of the first world-space pipeline 352(0) and second world-space pipeline 352(1) processes tasks associated with the instructions, and generate primitives for processing by the first screen-space pipeline 354(0) and the second screen-space pipeline 354(1). The first world-space pipeline 352 (0) and second world-space pipeline 352(1) each include a bounding box generator unit (not shown) that determines to which screen space pipeline—the first screen-space pipeline 354(0) or the second screen-space pipeline 354(1)—each primitive should be transmitted. To make this determination, the bounding box generator unit generates bounding boxes for each primitive, and compares the bounding boxes to raster tiles 420. If a bounding box associated with a primitive overlaps one or more raster tiles associated with a particular screen-space pipeline 354, then the bounding box generator unit determines that the primitive is to be transmitted to that screen-space pipeline 354. A primitive may be transmitted to multiple screen-space pipelines 354 if the primitive overlaps raster tiles 420 associated with more than one screen-space pipeline 354. After the world-space pipelines 352 generate the primitives, the world-space pipelines 352 transmit the primitives to the crossbar unit 530, which transmits the primitives to the corresponding tiling units 375 as specified by the bounding box generator unit.

The tiling units 575 receive primitives from the crossbar unit 530. Each tiling unit 575 accepts and stores these primitives until the tiling unit 575 decides to perform a flush operation. Each tiling unit 575 decides to perform a flush operation when one or more resource counters maintained by the tiling units 575 indicates that a resource has exceeded a threshold. Each tiling unit 575 may also perform a flush operation upon receiving a command from upstream in the graphics processing pipeline 500 requesting that the tiling unit 575 perform a flush operation. Such a command is referred to herein as a "flush-tiling-unit command." The device driver 103 may transmit the flush-tiling-unit command to the graphics processing pipeline 500 in situations that the device driver 103 deems appropriate.

Upon receiving primitives, a tiling unit 575 updates several resource counters associated with the primitives. The resource counters are configured to track the degree of utilization of various resources associated with the primitives received by the tiling units 575. Resources are either global resources or local resources. Global resources are pools of resources that are shared by all screen-space pipelines 354 and world-space pipelines 352. Local resources are resources that not shared between screen-space pipelines 354 or between world-space pipelines 352. Several examples of local and global resources are now provided.

One type of local resource is a primitive storage space for storing primitives in a tiling unit 575. Each tiling unit 575 includes a primitive storage space that is maintained independently of primitive storage space for other tiling units 575. When a tiling unit 575 receives a primitive, some of the primitive storage space is occupied by the primitive. Because only a limited amount of primitive storage space exists for each tiling unit 575, exceeding a threshold amount of storage space in a particular tiling unit 575 causes the tiling unit 575 to perform a flush operation.

One type of global resource is a vertex attribute circular buffer. The vertex attribute circular buffer includes circular buffer entries that include vertex attributes. The vertex attribute circular buffer is available to units in the graphics subsystem 500 for reading vertex attributes associated with primitives. Each circular buffer entry in the vertex attribute circular buffer occupies a variable amount of storage space. Each tiling unit 575 maintains a count of the amount of space occupied by circular buffer entries associated with primitives in the tiling unit 575.

In one embodiment, the vertex attribute circular buffer may be structured as a collection of smaller per-world-space-pipeline circular buffers. Each per-world-space-pipeline circular buffer is associated with a different world-space pipeline 352. If memory space associated with any of the per-world-space-pipeline circular buffers exceed a threshold value, then the associated tiling unit performs a flush operation.

Another type of global resource is a pool of constant buffer table indices. At the application-programming-interface level, an application programmer is permitted to associate constants with shader programs. Different shader programs may be associated with different constants. Each constant is a value that may be accessed while performing computations associated with the shader programs. The pool of constant buffer table indices is a global resource by which constants are associated with shader programs.

When a tiling unit 575 performs a flush operation, the tiling unit 575 iterates through all of the cache tiles 410, and for each cache tile 410, generates a cache tile batch that includes primitives that overlap the cache tile 410, and transmits the cache tile batches to the associated screen-space pipeline 354. Each tiling unit 575 is associated with a different screen-space pipeline 354. Thus, each tiling unit 575 transmits cache tile batches to the associated screen-space pipeline 354.

The tiling unit 575 transmits these cache tile batches to the screen-space pipeline 354 associated with the tiling unit as the cache tile batches are generated. The tiling unit 575 continues to generate and transmit cache tile batches in this manner for all cache tiles 410 associated with a render target. In one embodiment, the tiling unit 575 determines which primitives overlap a cache tile 410 by comparing a border of the cache tile 410 with bounding boxes associated with the primitives and received from the bounding box unit.

The cache tile batches flow through the screen-space pipelines 354 in the order in which the tiling unit 575 generates the cache tile batches. This ordering causes the units in the screen-space pipelines 354 to process the primitives in cache tile order. In other words, the screen-space pipelines 354 process primitives that overlap a first cache tile, and then process primitives that overlap a second cache tile, and so on.

Conceptually, each cache tile batch can be thought of as beginning at the point in time at which the tiling unit 575 began accepting primitives after the previous flush operation. In other words, even though the cache tile batches are transmitted to and processed by the screen-space pipelines 354 sequentially, each cache tile batch logically begins at the same point in time. Of course, because the cache tiles generally do not overlap in screen space, sequential processing in this manner generally produces the desired results.

As shown, graphics processing pipeline 500 includes count memories 555 and accumulating memories 557. Count memories 555 are configured to track a count associated with a particular event as work is processed by the screen-space pipeline 354. For example, count memories 555 may be configured to track a number of pixels for which a specific operation is performed by the pixel shader 390. The accumulating memories 557 are updated in conjunction with the count memories 555 to provide event count reports to an external memory location included in an external memory unit, such as system memory 104 or a PP memory 204. Operation of the accumulating memories 557 in conjunction with the count memories 555 is described in greater detail with respect to FIGS. 7-10.

The count memories 555 and accumulating memories 557 are depicted in FIG. 5 as being included in the pixel shaders 390. However, the count memories 555 and accumulating memories 557 may be in other units, such as the rasterizer 385 or the raster operations unit 395. The count memories 555 may be configured to track an event count associated with the unit in which the count memories are stored 555 or otherwise associated. For example, a count memory 555 stored in the raster operations unit 395 may be configured to track a number of pixels that pass a z-test. Additionally, each screen-space pipeline 354 may include more than one of each of the count memories 555 and accumulating memories 557, in different units or in the same units, each configured to track a different event count. In some embodiments, the count memory 555 and accumulating memory 557 is not physically stored in the corresponding unit, but are still logically associated with that unit.

The count memories 555 and accumulating memories 557 are configured to respond to certain commands that flow through the screen-space pipeline 354. One such command is a command to set the value of the count memory 555 or the accumulating memory 557. Such a command may set the value stored in the count memory 555 or the accumulating memory 557 to any value, such as 0 or a value stored at another location. Another such command is a report command. A report command specifies a particular event count to record. When issued by the driver 103, a report command travels to the tiling unit 575.

In some embodiments, the driver 103 first transmits the report command to front end 212, which transmits the report command to a screen-space circular buffer. Subsequently, the tiling unit 575 retrieves the report command from the screen-space circular buffer at the correct point in time in application-programming-interface order (API order). API order is the order in which the driver 103 transmits work, such as primitives and commands, to the graphics processing pipeline 500. In other embodiments, the driver 103 transmits the report command to front end 212, which transmits the report command to the world-space pipeline 352. The world-space pipeline 352 transmits the report command to the crossbar unit 530, which transmits the report command to each tiling unit 575. The tiling unit 575 inserts the report command in each cache tile batch in API order.

When the report command arrives at the unit in the screen-space pipeline 354 that is associated with the event count specified by the report command, the report command records the value stored in the count memory 555 associated with that event count and travels through the rest of the screen-space pipeline 354. When a command to clear the count memory value 555 arrives at the unit in the screen-space pipeline 354, that unit also clears the value in the count memory 555 (i.e, sets the value to 0). When the report command, now storing the event count from the count memory 555, arrives at the raster operations unit 395, the raster operations unit 395 forwards the report command to the front end unit 212. The front end unit reads the value stored in the report command and performs an atomic add operation to add the value to a value stored at an external memory location specified by the report command.

As described above, the tiling unit 575 receives primitives and a report command and generates cache tile batches. Each cache tile batch includes primitives that overlap the cache tile associated with the cache tile batch, as well as the report command. Within each cache tile batch, the primitives and report command are organized in application-programming-interface order (API order). API order is the order in which the commands associated with the primitives and the report command are received by the driver 103.

In the tiling architecture implemented in the graphics processing pipeline 500, including only the report command in each cache tile batch, without more, generally does not produce desired event count reports. An explanation of what event count reports are produced when only the report command is included in each cache tile batch and why those even count reports are unsatisfactory is provided below in conjunction with FIG. 6. FIGS. 7-10 illustrate additional commands that the tiling unit 575 includes in the cache tile batches in order to produce the desired event count results.

Managing Event Counts Reports in a Cache Tiling Architecture

Figure 6:
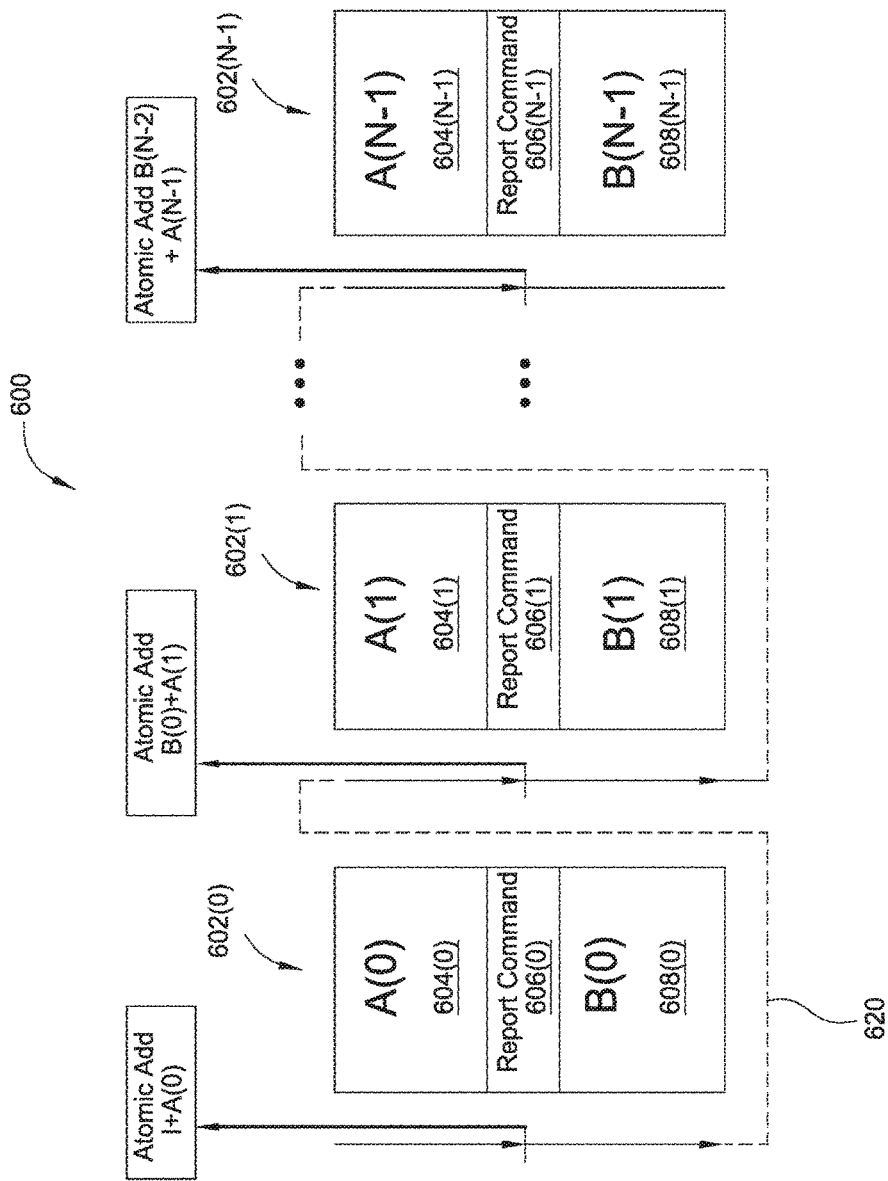
FIG. 6 is a workflow diagram conceptually illustrating cache tile batches produced by a tiling unit, according to one embodiment of the present invention.

FIG. 6 is a workflow diagram 600 conceptually illustrating cache tile batches produced by a tiling unit 575, according to one embodiment of the present invention. The workflow diagram 600 depicts cache tile batches 602 produced as the result of a flush operation, with the first cache tile batch 602(0) being the earliest cache tile batch produced and the last cache tile batch 602(N–1) being the final cache tile batch produced. Cache tile batch 602(1) is an intermediate cache tile batch 602. Other intermediate cache tile batches 602 are produced but are not depicted in FIG. 6.

As shown, each of the cache tile batches 602 includes a first set of primitives 604, labeled "A(X)", a report command 606, and a second set of primitives 608, labeled "B(X)." The first set of primitives 604, report command 606, and second set of primitives 608 are included in each cache tile batch in API order. The first set of primitives 604 also includes a command to clear the value stored in the count memory 555 to zero after executing the report command 606. After generating the cache tile batches, the tiling unit 575 transmits the cache tile batches to the screen-space pipeline 354 for processing. Workflow progression line 620 illustrates the order in which the cache tile batches 602 are processed by the screen-space pipeline.

The first cache tile batch 602(0) includes first set of primitives 604(0), which are processed by the screen-space pipeline 354. As the screen-space pipeline 354 processes the first set of primitives 604(0), the count memory 555 is updated to reflect an event count. When the pixel shader 390

(i.e., the unit associated with the count memory 555) receives the report command 606(0), the pixel shader 390 stores the value stored in the count memory 555 in the report command 606(0) and forwards the report command down the screen-space pipeline 354. The pixel shader 390 also executes the command to clear the count memory value 555, which clears the value stored in the count memory 555 to 0.

When the report command arrives at the front end unit 212, the front end unit 212 performs an atomic add operation on the memory location specified by the report command. The atomic add operation adds the value specified by the count memory 555 to the specified memory location. As described above, the memory location is in an external memory unit, such as system memory 104 or PP memory 204.

Because the count memory 555 is updated by work that flows through the screen-space pipeline 354, regardless of which cache tile the work is included in, the count memory 555 reflects work associated with the first set of primitives 604(0), as well as work that is processed by the screen-space pipeline 354 prior to receiving the first cache tile batch 602(0). Therefore, the value stored in the count memory 555 when the report command 606(0) arrives at the pixel shader 390 includes an "initial value I"—reflective of work completed prior to the first cache tile batch 602(0)—as well as the value A(0), reflective of work associated with the first set of primitives 604(0). The report command 606(0) thus adds the value "I+A(0)" to the memory location specified by the report command 606(0). The value stored in the memory location is now $I_0+I+A(0)$, where $I_0$ is an initial value stored at the memory location.

After the pixel shader 390 receives the report command 606(0), the pixel shader 390 receives and processes the second set of primitives 608(0). When the pixel shader 390 processes the second set of primitives 608(0), the pixel shader 390 updates the value stored in the count memory 555. Thus, at the end of the first cache tile batch 602(0), the value in the count memory 555 stores a value associated with the second set of primitives 608(0), which is B(0).

After receiving the second set of primitives 608(0), the pixel shader 390 receives a first set of primitives 604(1) in the second cache tile batch 602(1). When the pixel shader 390 processes the first set of primitives 604(1), the pixel shader updates the value stored in the count memory 555 to reflect the work associated with the first set of primitives 604(1). When the pixel shader 390 receives the second report command 606(1), the count memory 555 stores the value of B(0)+A(1). The pixel shader 390 includes this value in the report command 606(1) and forwards the report command 606(1) down the screen-space pipeline 354. The pixel shader 390 also clears the value in the count memory 555 to 0. The front end unit 212 adds the value stored in the report command 606(1) to the memory location specified by the report command 606(1), which is the same memory location as specified by the first report command 606(0), and by all other report commands 606 depicted in FIG. 6. The value stored in the memory location is now $I_0+I+A(0)+B(0)+A(1)$.

Processing as described above continues for all cache tile batches 602 depicted in FIG. 6, until the final cache tile batch 602(N−1). When the pixel shader 390 processes the first set of primitives 604(N−1) included in the final cache tile batch 602(N−1), the pixel shader 390 updates the count memory 555 to the appropriate value. The report command 606(N−1) records this value. The pixel shader 390 also clears the count memory 555. When the report command 606(N−1) arrives at front end 212, front end 212 adds the value in the report command 606(N−1) to the memory location. The value stored in the memory location is now $I_0+I+A(0)+B(0)+A(1)+ \ldots +B(N-2)+A(N-1)$.

As these results show, the value stored at the memory location at the end of processing the cache tile batches 602 illustrated in FIG. 6 is not the desired result. Logically, the report commands 606 are inserted into each cache tile after a first set of primitives A, but before a second set of primitives B. Thus, the desired result for the report command 606 would be to include all work associated with A, but to include none of the work associated with B. However, the value stored in the memory location includes work associated with both A and B. This discrepancy is caused by the fact that although all work associated with A is "logically" processed first, in actuality, the work is processed in cache tile order. Thus, the count memory 555 records values in this order, which causes the discrepancy.

To avoid unsatisfactory outcomes, like those described above, the tiling unit 575 includes additional operations with each cache tile batch in order to record the desired results in the external memory location. The additional operations generally involve manipulating the values stored in the count memory 555 and the accumulating memory 557 to track values across the cache tile batches in a beneficial manner. These additional operations are discussed in more detail in FIGS. 7-10.

Figure 7:
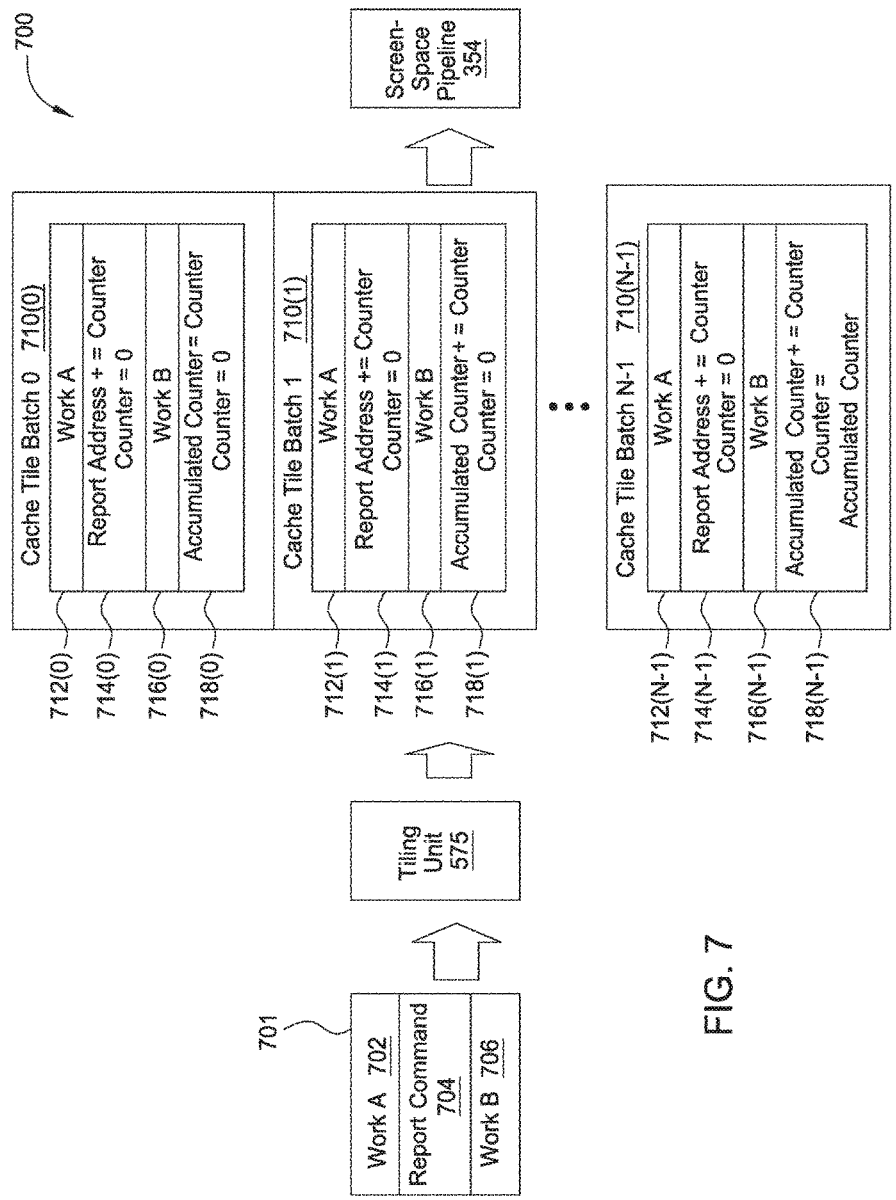
FIG. 7 conceptually illustrates a sequence of operations associated with the tiling unit, for managing event counts, according to one embodiment of the present invention.

FIG. 7 conceptually illustrates a sequence 700 of operations associated with the tiling unit 575, for managing event counts, according to one embodiment of the present invention. As shown, the sequence 700 of operations includes work 701 received by the tiling unit 575, and cache tile batches 710 generated by the tiling unit and provided to the screen-space pipeline 354.

The tiling unit 575 receives the work 701, which includes a first set of primitives 702, a report command 704, and a second set of primitives 706. The tiling unit 575 generates cache tile batches 710 and outputs the cache tile batches to the screen-space pipeline 354 for processing. The cache tile batches 710 each include primitives that overlap a particular cache tile, report commands, and commands to modify the value stored in the count memory 555 and the accumulating memory 557.

A first cache tile batch 710(0) includes a first set of primitives 712(0) (labeled "Work A"), which includes primitives included in work A 702 that overlap the cache tile associated with the first cache tile batch 710(0). After the first set of primitives 712(0), the first cache tile batch includes a report command 714(0). The tiling unit 575 includes the report command 714 at a location in the cache tile batch 710(0) that corresponds to the location of the report command 704 in work 701 received by the tiling unit 575. The report command 714(0) records the value stored in the count memory 555 and causes the pixel shader 390 to set the value in the count memory 555 to zero. The report command flows through the screen-space pipeline 354. When the report command 714(0) arrives at ROP 395, ROP 395 forwards the report command 714(0) to the front end unit 212, which causes the value stored in the report command 714(0) to be added to a memory location specified by the report command 714(0). In some embodiments, the value is added atomically, to accommodate parallel processing.

After the report command 714(0), the first cache tile batch 710(0) includes a second set of primitives 716(0) (labeled "Work B"), which includes primitives included in work B 706 that overlap the cache tile associated with the first cache tile batch 710(0). After the second set of primitives 716(0), the first cache tile batch 710(0) includes a command to modify the accumulating memory 557 and the count memory 555. The command to modify the accumulating memory 557 is configured to set the value stored in the accumulating memory 557 to be equal to the value stored in the count memory 555. The first cache tile batch 710(0) also includes a command to reset the count memory 555 to zero after the command to set the value in the accumulating memory 557.

The second cache tile batch 710(1), which is termed an "intermediate cache tile batch" due to being neither the first cache tile batch 710(0) nor the last tile batch 710(N−1) includes the following work. First, the second cache tile batch 710(1) includes a first set of primitives 712(1) (labeled "Work A"), which includes primitives included in work A 702 that overlap the cache tile associated with the second cache tile batch 710(1). After the first set of primitives 712(1), the second cache tile batch includes a report command 714(1). The report command 714(1) records the value stored in the count memory 555 and causes the pixel shader 390 to set the value in the count memory 555 to zero. As described above with respect to the first cache tile batch 710(0), the report command flows through the screen-space pipeline 354 and causes the front end unit 212 to add the value in the report command 714(1) to the value in the memory location specified by the report command 714(1). The memory location for the report command 714(1) is the same as the memory location for the report command 714(0), and for all other report commands 714(X) in the other cache tile batches 710 generated by the tiling unit 575 as a result of receiving work 701.

After the report command 714(1), the second cache tile batch 710(1) includes a second set of primitives 716(1) (labeled "Work B"), which includes primitives included in work B 706 that overlap the cache tile associated with the second cache tile batch 710(1). After the second set of primitives 716(1), the second cache tile batch 710(1) includes a command to modify the accumulating memory 557 and the count memory 555. The command to modify the accumulating memory 557 is configured to add the value stored in the count memory 555 to the value stored in the accumulating memory 557. The second cache tile batch 710(1) also includes a command to reset the count memory 555 to zero after the command to set the value in the accumulating memory 557. The command to modify the accumulating memory 557 for the second cache tile batch 710(1) is slightly different than the command to modify the accumulating memory 557 for the first cache tile batch 710(0). More specifically, the command to modify the accumulating memory 557 for the second cache tile batch 710(1) adds the value stored in the count memory 555 to the value stored in the accumulating memory 557, instead of simply setting the value of the accumulating memory 557 to be equal to the value stored in the count memory 555. Other intermediate cache tile batches 710 include commands similar to the commands included in the second cache tile batch 710(1).

The final cache tile batch 710(N−1) includes the following work. First, the final cache tile batch 710(N−1) includes a first set of primitives 712(N−1) (labeled "Work A"), which includes primitives included in work A 702 that overlap the cache tile associated with the final cache tile batch 710(N−1). After the first set of primitives 712(N−1), the final cache tile batch includes a report command 714(N−1). The report command 714(N−1) records the value stored in the count memory 555 and causes the pixel shader 390 to set the value in the count memory 555 to zero. As described above with respect to the first cache tile batch 710(0) and the second cache tile batch 710(1), the report command flows through the screen-space pipeline 354 and causes the front end unit 212 to add the value in the report command 714(N−1) to the value in the memory location specified by the report command 714(N−1). As described above, the memory location for the report command 714(N−1) is the same as the memory location for the report command 714(0) and the report command 714(1).

After the report command 714(N−1), the final cache tile batch 710(N−1) includes a second set of primitives 716(N−1) (labeled "Work B"), which includes primitives included in work B 706 that overlap the cache tile associated with the final cache tile batch 710(N−1). After the second set of primitives 716(N−1), the final cache tile batch 710(N−1) includes a command to modify the accumulating memory 557 and the count memory 555. As with the command to modify the accumulating memory in the second cache tile batch 710(1), the command to modify the accumulating memory 557 in the final cache tile batch 710(N−1) is configured to add the value stored in the count memory 555 to the value stored in the accumulating memory 557. The final cache tile batch 710(N−1) also includes a command to set the value stored in the count memory 555 to be equal to the value stored in the accumulating memory 557. The purpose of this command is to cause the count memory 555 to store the "carryover" from the current flush operation. This carryover is reflective of the event count for all of Work B processed for all cache tile batches 710. If a subsequent flush operation includes another report command, then this carryover is added to the value calculated for the subsequent flush operation in order to produce the desired results.

Although the examples provided in FIG. 6 depict each cache tile batch as including primitives corresponding to both work A 702 and work B 706, some cache tile batches may include no primitives corresponding to either work A 702 or work B 706, or both. In such cases, the steps described above still produce the desired count results. The tiling unit 575 simply inserts the report commands 714 and accumulate commands 718 in API order.

In some flush operations, no report commands may be included in the work received by the tiling unit 575. In such cases, the count memory 555 simply accumulates counts for the events that occur for all of the cache tile batches for such flush operations. If a report command is included in a subsequent flush operation, then that report command produces desired results because the report commands are configured to report event counts accumulated since a previous report command.

In some flush operations, multiple report commands 704 are included. In such cases, the tiling unit 575 inserts a corresponding report command 714 for each of the report commands 704. Each of the different report commands 704 received by the tiling unit 575 specifies a different external memory address. Therefore, the different report commands 714 accumulate values in different memory addresses. (Of course, each of the report commands 714 replicated across cache tile batches 710 that correspond to a single report command 704 specifies the same memory address. However, report commands 714 that correspond to different report commands 704 received by the tiling unit 575 specify different memory addresses). An example of multiple report commands 704 included in a single flush operation is described with respect to FIG. 9.

Figure 8:
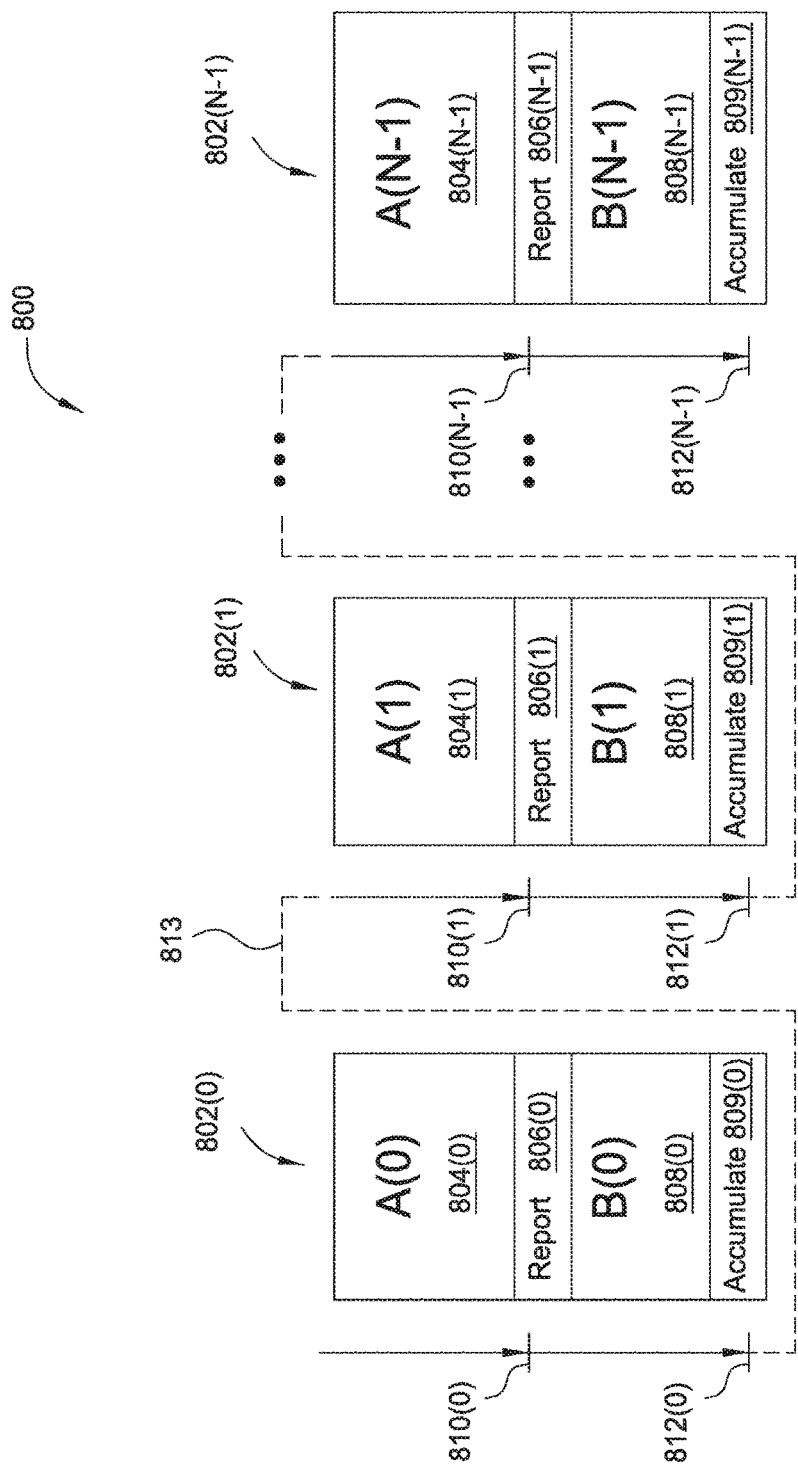
FIG. 8 is a workflow diagram conceptually illustrating work associated with cache tile batches produced by a tiling unit for a single flush operation, according to one embodiment of the present invention.
Figure 9:
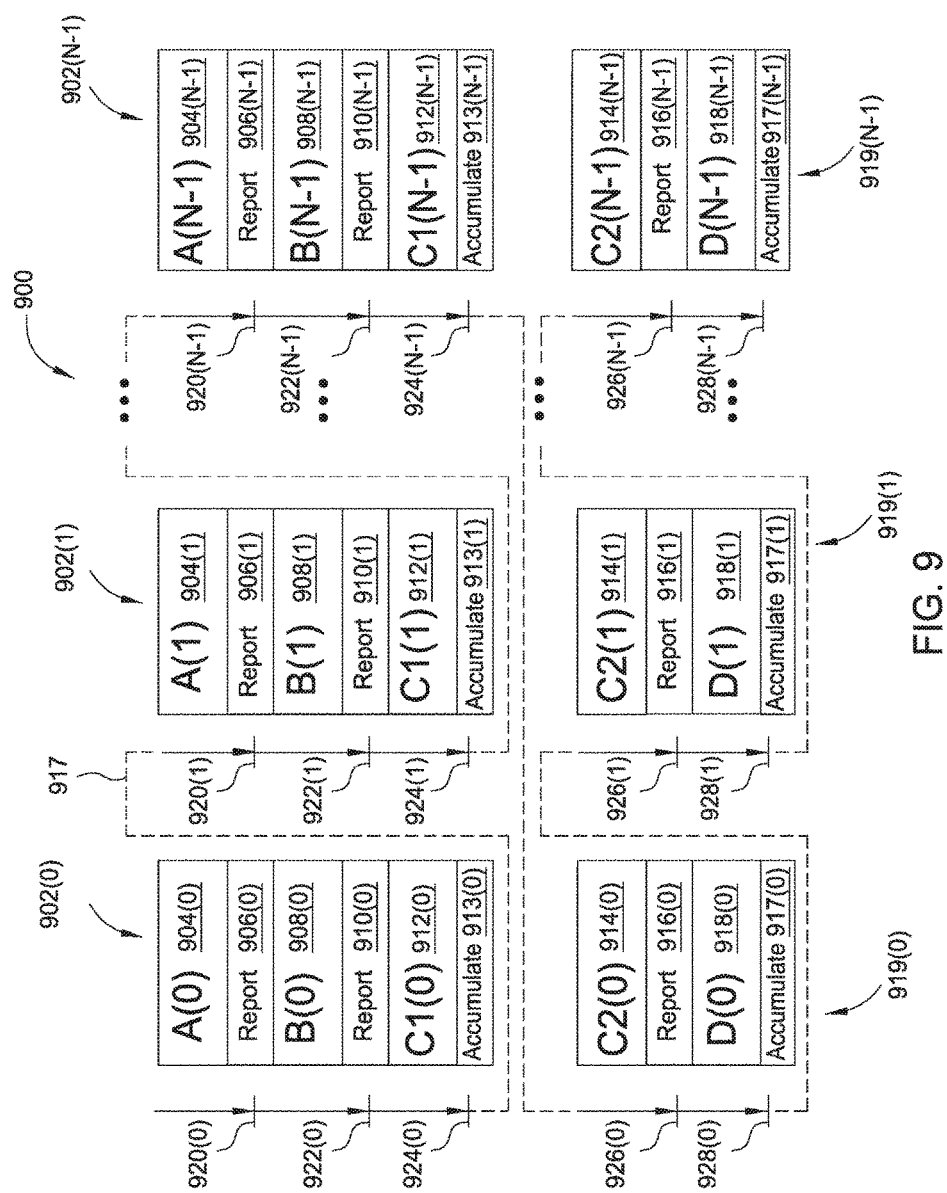
FIG. 9 is a workflow diagram conceptually illustrating work associated with cache tile batches produced by a tiling unit for two flush operations, according to one embodiment of the present invention.

Several example workflow sequences are now described to illustrate operation of the tiling unit 575 for generating event counts. FIG. 8 illustrates a workflow depicting a single flush operation and FIG. 9 illustrates a workflow depicting two flush operations.

FIG. 8 is a workflow diagram 800 conceptually illustrating work associated with cache tile batches produced by a tiling unit 575 for a single flush operation, according to one embodiment of the present invention. The workflow diagram 800 depicts a sequence of work associated with cache tile batches 802 produced as the result of a flush operation. The first cache tile batch 802(0) is the earliest cache tile batch, the second cache tile batch 802(1) is an intermediate cache tile batch, and the last cache tile batch 802(N-1) is the final cache tile batch produced. Other intermediate cache tile batches 802 are produced but not depicted in FIG. 8. Several sequence checkpoints 810 are indicated in the workflow diagram 800. The sequence checkpoints 810 indicate points in the workflow sequence 800 at which the accumulating memory 557 and memory location associated with the command report are updated. Workflow line 813 indicates the order of processing of the cache tile batches 802.

The report commands 806 are similar to the report commands 714 described with respect to FIG. 7. The accumulate commands 809 are similar to the commands to modify the count memory 555 and the accumulating memory 557, discussed above with respect to FIG. 7. Table 1, provided below, depicts the values of the external memory location, the count memory, and the accumulating memory at the various checkpoints.

choose to initialize this value to zero before generating the report request. Second, $I_0$ includes the value stored in the count memory 555 from previous flush operations. As described above, this "carry-over" represents event counts from previous flush operations. The value stored in the accumulating memory 557 at checkpoint 810(0) is irrelevant because that value is not examined or included in any operations associated with the report requests 806 or accumulate commands 809 and is overwritten. The accumulating memory 557 is first written to in the first accumulate command 809(0) associated with the first cache tile batch 802(0).

FIG. 9 is a workflow diagram 900 conceptually illustrating work associated with cache tile batches produced by a tiling unit 575 for two flush operations, according to one embodiment of the present invention. The workflow diagram 900 is similar to the workflow diagram 800, except that workflow diagram 900 depicts two flush operations, and that in the first flush operation, two report requests are provided. In the first flush operation, cache tile batches 902 are generated. In the second flush operation, cache tile batches 919 are generated.

In cache tile batches 902, report command 906 requests a report for event counts prior to report command 906 in API order. Similarly, report command 910 requests a report for event counts after report 906, but prior to report 910, in API order. Finally, report 916 requests a report for event counts after report 910, but prior to report 916. Each of report 906, report 910, and report 916 are associated with different external memory locations and record their respective values to those different external memory locations.

As with FIG. 8, sequence checkpoints 920, 922, 924, 926, and 928 indicate points in the workflow sequence 900 at which the accumulating memory 557, and external memory locations associated with the command reports are updated. Table 2, provided below, depicts the values of the external memory locations, the count memory, and the accumulating memory at the various checkpoints. External memory loca-

TABLE 1

Values of various memories at different checkpoints

| | Count Memory | Accumulating Memory | External Memory Location |
|---|---|---|---|
| Checkpoint 810(0) | 0 | — | $I_0 + A(0)$ |
| Checkpoint 812(0) | 0 | B(0) | $I_0 + A(0)$ |
| Checkpoint 810(1) | 0 | B(0) | $I_0 + A(0) + A(1)$ |
| Checkpoint 812(1) | 0 | B(0) + B(1) | $I_0 + A(0) + A(1)$ |
| Checkpoint 810(N-1) | 0 | B(0) + B(1) | $I_0 + A(0) + A(1) + \ldots + A(N-1)$ |
| Checkpoint 812(N-1) | B(0) + B(1) + $\ldots$ + B(N-1) | B(0) + B(1) + $\ldots$ + B(N-1) | $I_0 + A(0) + A(1) + \ldots + A(N-1)$ |

As shown in Table 1, the accumulating memory accumulates the event counts for the work after the report request 806 (i.e., all of the event counts associated with "A"). The external memory location accumulates the value for the work prior to the report request 806. $I_0$ includes two components. First, $I_0$ includes the value that is previously stored in the external memory location, if any. The driver 103 may tion 1 is associated with report 906. External memory location 2 is associated with report 910. External memory location 3 is associated with report 912. For simplicity, each of the external memory locations depicted in Table 2 is assumed to be initialized to "0" by the driver 103. Workflow order line 917 indicates the order of processing of the cache tile batches 902 and the cache tile batches 919.

TABLE 2

Values of various memories at different checkpoints

| | Count Memory | Accumulating Memory | External Memory Location 1 | External Memory Location 2 | External Memory Location 3 |
|---|---|---|---|---|---|
| Checkpoint 920(0) | 0 | — | $I_1 + A(0)$ | 0 | 0 |
| Checkpoint 922(0) | 0 | — | $I_1 + A(0)$ | $B(0)$ | 0 |
| Checkpoint 924(0) | 0 | $C1(0)$ | $I_1 + A(0)$ | $B(0)$ | 0 |
| Checkpoint 920(1)) | 0 | $C1(0)$ | $I_1 + A(0) + A(1)$ | $B(0)$ | 0 |
| Checkpoint 922(1) | 0 | $C1(0)$ | $I_1 + A(0) + A(1)$ | $B(0) + B(1)$ | 0 |
| Checkpoint 924(1) | 0 | $C1(0) + C1(1)$ | $I_1 + A(0) + A(1)$ | $B(0) + B(1)$ | 0 |
| Checkpoint 920(N-1) | 0 | $C1(0) + C1(1) + \ldots + C1(N-2)$ | $I_1 + A(0) + A(1) + \ldots + A(N-1)$ | $B(0) + B(1) + \ldots + B(N-2)$ | 0 |
| Checkpoint 922(N-1) | 0 | $C1(0) + C1(1) + \ldots + C1(N-2)$ | $I_1 + A(0) + A(1) + \ldots + A(N-1)$ | $B(0) + B(1) + \ldots + B(N-1)$ | 0 |
| Checkpoint 924(N-1) | $C1(0) + C1(1) + \ldots + C1(N-1)$ | $C1(0) + C1(1) + \ldots + C1(N-1)$ | $I_1 + A(0) + A(1) + \ldots + A(N-1)$ | $B(0) + B(1) + \ldots + B(N-1)$ | 0 |
| Checkpoint 926(0) | 0 | $C1(0) + C1(1) + \ldots + C1(N-1)$ | $I_1 + A(0) + A(1) + \ldots + A(N-1)$ | $B(0) + B(1) + \ldots + B(N-1)$ | $C1(0) + C1(1) + \ldots + C1(N-1) + C2(0)$ |
| Checkpoint 928(0) | 0 | $D(0)$ | $I_1 + A(0) + A(1) + \ldots + A(N-1)$ | $B(0) + B(1) + \ldots + B(N-1)$ | $C1(0) + C1(1) + \ldots + C1(N-1) + C2(0)$ |
| Checkpoint 926(1) | 0 | $D(0)$ | $I_1 + A(0) + A(1) + \ldots + A(N-1)$ | $B(0) + B(1) + \ldots + B(N-1)$ | $C1(0) + C1(1) + \ldots + C1(N-1) + C2(0) + C2(1)$ |
| Checkpoint 928(1) | 0 | $D(0) + D(1)$ | $I_1 + A(0) + A(1) + \ldots + A(N-1)$ | $B(0) + B(1) + \ldots + B(N-1)$ | $C1(0) + C1(1) + \ldots + C1(N-1) + C2(0) + C2(1)$ |
| Checkpoint 926(N-1) | 0 | $D(0) + D(1) + \ldots + D(N-2)$ | $I_1 + A(0) + A(1) + \ldots + A(N-1)$ | $B(0) + B(1) + \ldots + B(N-1)$ | $C1(0) + C1(1) + \ldots + C1(N-1) + C2(0) + C2(1) + \ldots + C2(N-1)$ |
| Checkpoint 928(N-1) | $D(0) + D(1) + \ldots + D(N-1)$ | $D(0) + D(1) + \ldots + D(N-1)$ | $I_1 + A(0) + A(1) + \ldots + A(N-1)$ | $B(0) + B(1) + \ldots + B(N-1)$ | $C1(0) + C1(1) + \ldots + C1(N-1) + C2(0) + C2(1) + \ldots + C2(N-1)$ |

As can be seen, the various external memories accumulate values for their respective subsets of work. The external memory location 1 includes a sum of all of the "A" values (plus previous work reflected in $I_1$). $I_1$ includes the "carry-over" stored in count memory 555 from previous flush operation(s). The external memory location 2 includes a sum of all of the "B" values. The external memory location 3 includes a sum of all of the "C" values, including the "C1" values and the "C2" values. At the end of the first flush operation, the sum for the C1 values is carried over to the second flush operation in the count memory 555. Thus, the report 916 generates results reflecting counts from both the C1 work and the C2 work. This is the desired result, since the report commands 916 record event counts since the previous report command 910.

Figure 10:
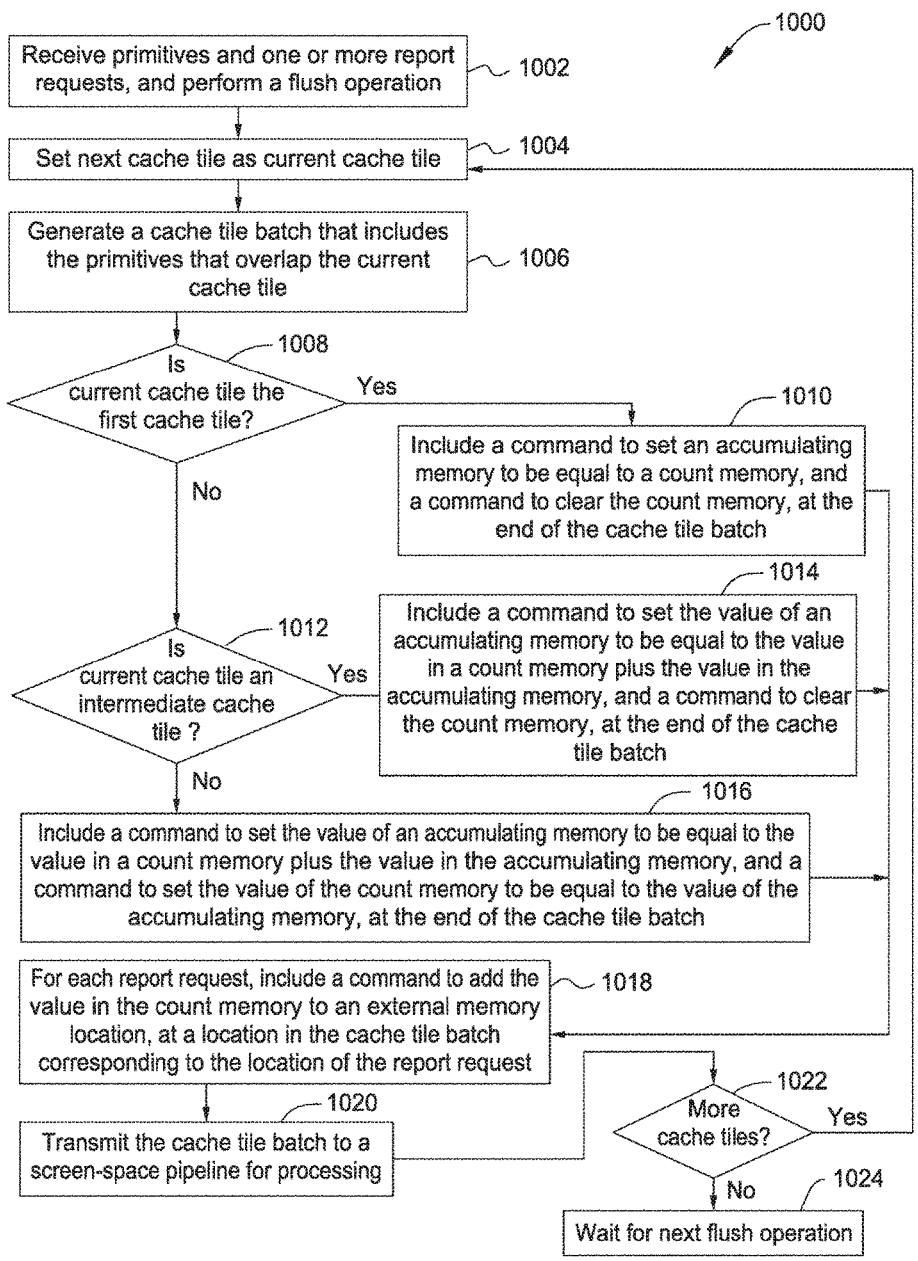
FIG. 10 is a flow diagram of method steps for recording event counts in a tile-based architecture, according to one embodiment of the present invention.

FIG. 10 is a flow diagram of method steps for recording event counts in a tile-based architecture, according to one embodiment of the present invention. Although the method steps are described in conjunction with the system of FIGS. 1-9, persons skilled in the art will understand that any system configured to perform the method steps, in any order, falls within the scope of the present invention.

As shown, a method 1000 begins in step 1002, where the tiling unit 575 receives primitives and one or more report requests, and the tiling unit 575 performs a flush operation. In step 1004, the tiling unit 575 sets the next cache tile as the current cache tile. At the beginning of the flush operation, the "next" cache tile is the first cache tile for a particular render target. In step 1006, the tiling unit 575 generates a cache tile batch that includes the primitives that overlap the current cache tile. In step 1008, the tiling unit 575 determines if the current cache tile is the first cache tile for a particular render target. If the current cache tile is the first cache tile for a particular render target, then the method proceeds to step 1010. In step 1010, the tiling unit 575 includes a command to set an accumulating memory to be equal to a count memory at the end of the cache tile batch. The tiling unit 575 also includes a command to clear the count memory at the end of the cache tile batch. After step 1010, the method proceeds to step 1018.

Referring back to step 1008, if the current cache tile is not the first cache tile, then the method proceeds to step 1012. In step 1012, the tiling unit 575 determines whether the current cache tile is an intermediate cache tile. If the current cache tile is an intermediate cache tile, then the method proceeds to step 1014. In step 1014, the tiling unit 575 includes a command to set the value of an accumulating memory to be equal to the value in a count memory plus the value in the accumulating memory at the end of the cache tile batch. The tiling unit 575 also includes a command to clear the count memory at the end of the cache tile batch. After step 1014, the method proceeds to step 1018.

Referring back to step 1012, if the current cache tile is not an intermediate cache tile, then the current cache tile is a final cache tile, and the method proceeds to step 1016. In step 1016, the tiling unit 575 includes a command to set the value of an accumulating memory to be equal to the value in a count memory plus the value in the accumulating memory at the end of the cache tile batch. The tiling unit 575 also includes a command to set the value of the count memory to be equal to the value stored in the accumulating memory at the end of the cache tile batch. After step 1016, the method proceeds to step 1018.

In step 1018, for each report request received by the tiling unit 575, the tiling unit 575 includes a command to add the value in the count memory to an external memory, at a location in the cache tile batch corresponding to the location of the report request. In step 1020, the tiling unit 575 transmits the cache tile batch to a screen-space pipeline 354 for processing. In step 1022, the tiling unit 575 determines whether there are more cache tiles left to process. If there are more cache tiles, then the method returns to step 1004. If there are not more cache tiles to process, then the method proceeds to step 1024, in which the tiling unit 575 waits for the next flush operation.

In sum, a screen-space pipeline includes a unit configured to record an event count. The unit is associated with a count memory and an accumulator memory. The count memory is configured to track the event count. The tiling unit receives work and a request for an event count. When the tiling unit reorganizes work and generates cache tile batches for transmission to the screen-space pipeline, the tiling unit includes certain commands in the cache tile batches that are configured to update the count memory, the accumulator memory, and an external memory to record the event count.

In a first cache tile batch, the tiling unit includes a command to add the value in the count memory to an external memory address specified by the event count request. The tiling unit also includes a command to reset the count memory to zero. The command to set the external memory address and to reset the count memory are included in the first cache tile batch at a point corresponding to the request for the event count. The tiling unit also includes at the end of the first cache tile batch a command to set the accumulator memory to be equal to the value in the count memory and to set the count memory to zero.

In each intermediate cache tile batch, the tiling unit includes a command to add the value in the count memory to the external memory address. The tiling unit also includes a command to reset the count memory to zero in each intermediate cache tile batch. The tiling unit includes the command to set the value in the external memory address and to reset the count memory at the point in the intermediate cache tile batch corresponding to the request for the event count. The tiling unit also includes at the end of each intermediate cache tile batch a command to add the value in the count memory to the value in the accumulator memory and to set the count memory to zero.

Finally, in a final cache tile batch, the tiling unit includes a command to add the value in the count memory to the external memory address. The tiling unit also includes a command to reset the count memory to zero in the final cache tile batch. The tiling unit includes the command to set the external memory address and the command to reset the count memory at the point in the final cache tile batch corresponding to the request for the event count. The tiling unit also includes at the end of the final cache tile batch a command to add the value in the count memory to the value in the accumulator memory and to set the count memory to be equal to the value in the accumulator memory One advantage of the disclosed approach is that event counts are generated in a tiling architecture having desired results. Another advantage is that multiple event counts may be included in each flush operation. An additional advantage is that the report commands track values across different flush operations.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

We claim:

1. A graphics processing system, comprising:
 a screen-space pipeline that includes a count memory and an accumulating memory; and
 a tiling unit that causes the screen-space pipeline to increment a value stored at an external memory address by a first value stored in the count memory when a first unit has completed processing a first set of primitives that overlap a first cache tile, and causes the screen-space pipeline to update the accumulating memory to reflect a second value stored in the count memory when the first unit has completed processing a second set of primitives that overlap the first cache tile.

2. The graphics processing system of claim 1, wherein the tiling unit receives a first plurality of primitives that includes the first set of primitives, receives a second plurality of primitives that includes the second set of primitives, determines that the first set of primitives overlaps the first cache tile, and determines that the second set of primitives overlaps the first cache tile.

3. The graphics processing system of claim 1, wherein the tiling unit receives a report request for a final count value associated with a first plurality of primitives that includes the first set of primitives.

4. The graphics processing system of claim 1, wherein the tiling unit transmits the first set of primitives, the second set of primitives, and a first set of commands to the screen-space pipeline for processing, wherein the first set of commands includes a first command that causes the screen-space pipeline to increment the value stored at the external memory address after processing the first command.

5. The graphics processing system of claim 4, wherein the first set of commands further includes a second command that causes the accumulating memory to store the second value stored in the count memory when the first unit has completed processing the second set of primitives.

6. The graphics processing system of claim 5, wherein the first set of commands further includes a third command that causes the count memory to be reset after the second command is processed.

7. The graphics processing system of claim 4, wherein the first set of commands further includes a second command that causes the second value to be added to the accumulating memory when the first unit has completed processing the second set of primitives.

8. The graphics processing system of claim 7, wherein the first set of commands further includes a third command that causes the count memory to be reset after the second command is processed.

9. The graphics processing system of claim 4, wherein the first set of commands further includes a second command that causes the second value to be added to the accumulating memory when the first unit has completed processing the second set of primitives, and the first set of commands further includes a third command that causes the count memory to store a value equal to a value stored in the accumulating memory after the second command is processed.

10. The graphics processing system of claim 1, wherein at least one primitive in the first set of primitives and at least one primitive in the second set of primitives cause the first unit to detect the event type and increment the count memory.

11. A computing device, comprising:
a memory; and
a graphics processing system that is coupled to the memory and includes:
a screen-space pipeline having a count memory and an accumulating memory; and
a tiling unit that causes the screen-space pipeline to increment a value stored at an external memory address by a first value stored in the count memory when a first unit has completed processing a first set of primitives, and causes the screen-space pipeline to update the accumulating memory to reflect a second value stored in the count memory when the first unit has completed processing a second set of primitives.

12. The computing device of claim 11, wherein the tiling unit receives a first plurality of primitives that includes the first set of primitives, receives a second plurality of primitives that includes the second set of primitives, determines that the first set of primitives overlaps a first cache tile, and determines that the second set of primitives overlaps the first cache tile.

13. The computing device of claim 11, wherein the tiling unit receives a report request for a final count value associated with a first plurality of primitives that includes the first set of primitives.

14. The computing device of claim 11, wherein the tiling unit transmits the first set of primitives, the second set of primitives, and a first set of commands to the screen-space pipeline for processing, wherein the first set of commands includes a first command that causes the screen-space pipeline to increment the value stored at the external memory address after processing the first command.

15. The computing device of claim 14, wherein the first set of commands further includes a second command that causes the accumulating memory to store the second value stored in the count memory when the first unit has completed processing the second set of primitives.

16. The computing device of claim 15, wherein the first set of commands further includes a third command that causes the count memory to be reset after the second command is processed.

17. The computing device of claim 14, wherein the first set of commands further includes a second command that causes the second value to be added to the accumulating memory when the first unit has completed processing the second set of primitives.

18. The computing device of claim 17, wherein the first set of commands further includes a third command that causes the count memory to be reset after the second command is processed.

19. The computing device of claim 14, wherein the first set of commands further includes a second command that causes the second value to be added to the accumulating memory when the first unit has completed processing the second set of primitives, and the first set of commands further includes a third command that causes the count memory to store a value equal to a value stored in the accumulating memory after the second command is processed.

20. The computing device of claim 11, wherein at least one primitive in the first set of primitives and at least one primitive in the second set of primitives cause the first unit to detect the event type and increment the count memory.

21. The computer-implemented method of claim 20, wherein at least one primitive in the first set of primitives and at least one primitive in a second set of primitives cause the first unit to detect the event type and increment the count memory.

22. The computer-implemented method of claim 20, further comprising receiving a first plurality of primitives that includes the primitives in the first set of primitives, receiving a second plurality of primitives that includes primitives in a second set of primitives, determining that the first set of primitives overlaps the first cache tile, and determining that the second set of primitives overlaps the first cache tile.

23. A computer-implemented method, comprising:
causing a screen-space pipeline to increment a value stored at an external memory address by a first value stored in a count memory when a first unit included in the screen-space pipeline and associated with the count memory has completed processing a first set of primitives that overlap a first cache tile.

* * * * *